United States Patent [19]

Macomber

[11] Patent Number: 4,807,848

[45] Date of Patent: Feb. 28, 1989

[54] CONNECTING DEVICE

[75] Inventor: Kenneth R. Macomber, 110 Tamara, Kalkaska, Mich. 49646

[73] Assignee: Kenneth R. Macomber, Kalkaska, Mich.

[21] Appl. No.: 122,172

[22] Filed: Nov. 18, 1987

Related U.S. Application Data

[63] Continuation of Ser. No. 932,891, Nov. 3, 1986, abandoned.

[51] Int. Cl.[4] .................... F16L 37/28

[52] U.S. Cl. .................... 251/149.4; 141/349

[58] Field of Search .................... 251/149.4; 141/353, 141/348, 386, 18, 349

[56] References Cited

U.S. PATENT DOCUMENTS

| | | | |
|---|---|---|---|
| 1,572,554 | 2/1926 | Milner | 251/149.6 |
| 2,645,241 | 7/1953 | Riede | 141/349 |
| 3,731,318 | 5/1973 | Gramig | 141/384 |
| 4,341,245 | 7/1982 | Daicho et al. | 141/18 |

FOREIGN PATENT DOCUMENTS

| | | | |
|---|---|---|---|
| 221580 | 5/1959 | Australia | 251/149.4 |

*Primary Examiner*—A. Michael Chambers
*Attorney, Agent, or Firm*—Varnum, Riddering, Schmidt & Howlett

[57] ABSTRACT

A device (10) for use in connecting unlike gas/liquid fuel containers (12,14) and transferring gas/liquid fuel between the containers (12,14). The device (10) comprises threaded first and second ends (28,34) and a central longitudinal bore (40). The first end (28) is adapted to threadably engage an industry standard outlet of the container (12) to mount the device (10) to the container (12). The second end (34) is adapted to theadably engage an industry standard inlet on the other container (14) to mount the device (10) to the container (14). A finger (36) mounted to and extending outwardly from the second end (34) is adapted to engage and open a needle valve of the container (14) to permit fuel to flow between the containers (12,14) when the device (10) is connected to the containers (12,14).

15 Claims, 1 Drawing Sheet

CONNECTING DEVICE

CROSS-REFERENCE TO RELATED APPLICATION

This is a continuation of application Ser. No. 932,891, filed Nov. 3, 1986 now abandoned.

BACKGROUND OF THE INVENTION

1. Field of the Invention

This invention relates to devices for connecting conduits and more particularly to a device for connecting unlike gas/liquid fluid containers to transfer fuel from one container to the other.

2. Description of the Prior Art

Two different gas/liquid fuel systems are currently used for the majority of all portable gas/liquid fuel applications. In one system, a container or tank typically includes a 7–8 inch threaded fuel outlet. Generally, the fuel in this type of container is used for heating and cooking in mobile units, e.g., camp trailers, mobile homes, etc., and for fueling backyard grills and heating torches. Containers of this type are usually refillable.

In the other system, a hand-held container or cylinder includes a one-inch threaded inlet with a needle valve. Typical applications of this type of container include soldering, thawing, brazing and cooking. Containers of this type are not typically refillable.

Propane is the most common fuel in both systems, however, butane and other gas/liquid fuels are also used.

It has been found desirable to provide a device for conveniently connecting a fueled tank of the type described first above to a substantially empty hand-held cylinder to permit easy and safe fueling of the cylinder from the tank.

SUMMARY OF THE INVENTION

According to the invention, a device connects first and second containers and transmits fluid between the containers. The first container comprises a neck or female connecting means having an outlet and valve movable between a closed position to close the outlet and an open position to permit fluid to exit or enter the first container through the outlet. The second container comprises a neck portion or male connecting means having an inlet and a needle valve movable between an outer position to close the inlet and an inner position to permit fluid to enter or exit the second container through the inlet. The needle valve is normally urged in its outer position by a biasing means.

The device comprises a first or male end adapted to be removably mounted to the first container neck, a second or female end adapted to be removably mounted to the second container neck portion, a longitudinal bore extending through the first and second ends and adapted to align with the first container outlet and second container inlet when the device is mounted to the first and second containers and a finger means adapted to force the needle valve to the inner position against the biasing means when the device is mounted to the second container. Fluid is transferred between the first and second containers when the device is mounted to the first and second containers and the first container valve is set in the open position.

The device further includes first and second mounting means on the first and second ends of the device and adapted to securely mount and seal the device with respect to the first container neck and second container neck portion, respectively.

The first container neck adjacent the outlet further comprises a socket having a first threaded inner wall. The second container neck portion adjacent the inlet further comprises a second threaded outer wall. The device bore comprises an enlarged portion at the device second end. The first mounting means comprises a first threaded outer wall adapted to register with the socket and threadably engage the first threaded inner wall to mount and seal the device with respect to the first container. The second mounting means comprises a second threaded inner wall of the bore enlarged portion and adapted to threadably engage the second threaded outer wall to mount and seal the device with respect to the second container.

The finger means is tubular, is positioned in registry with the bore enlarged portion, has inner and outer ends and a longitudinal aperture extending through the inner and outer ends and aligned with the bore and is either securely mounted to or formed integral with a wall of the bore adjacent the bore enlarged portion. Fluid is transferred between the first and second containers through the aligned bore and the finger means aperture.

In the preferred embodiment, the finger means is securely mounted to the wall of the bore. To this end, the finger means includes an outer threaded side at the inner end and a portion of the bore wall is threaded. The finger means threaded side is adapted to threadably engage and seal with respect to the bore wall to securely mount and seal the finger means to the bore wall.

In addition, the finger means outer end comprises inwardly opposing walls forming a narrow slot therebetween aligned with the aperture. The walls are adapted to engage and move the needle valve to the inner position, with the needle valve resting against edges of the wall and in partial registry with the slot, when the device is mounted to the second container.

BRIEF DESCRIPTION OF THE DRAWINGS

Reference will now be made to the drawings in which.

DESCRIPTION OF THE PREFERRED EMBODIMENTS

Figure 1:
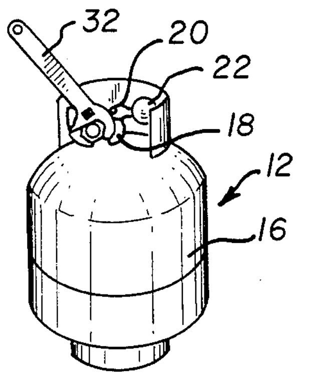
FIG. 1 is a perspective view of a connecting device according to the invention being threadably mounted to a conventional fuel tank by a conventional wrench.

Referring now to the drawings in detail, there is shown a device 10 for connecting a conventional fuel tank 12 (hereinafter sometimes referred to as the "first container") to a conventional fuel cylinder 14 (hereinafter sometimes referred to as the "second container") to permit fuel (not shown) to flow between the tank and cylinder, preferably to permit fuel to flow from a fueled tank to an empty cylinder.

Figure 2:
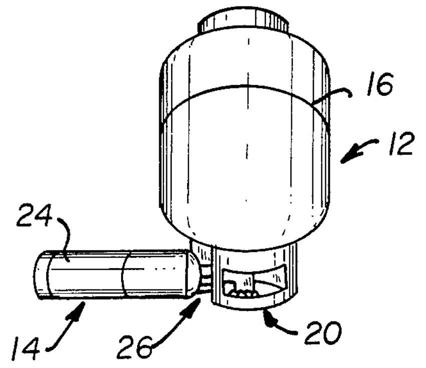
FIG. 2 is an elevational view of the device and tank being connected to a conventional hand-held fuel cylinder.

Referring specifically to FIGS. 1 and 2, a fully fueled tank 12 typically contains 5–40 pounds of pressurized gas/liquid fuel, generally propane. The tank 12 is conventionally cylindrical in shape along main body portion 16 thereof and tapers to a small neck 18 mounting a flow-regulating valve 20 movable between open and closed positions upon manual actuation of a knob 22. In the open position of the valve 20, fuel is permitted to flow from the tank 12 through an outlet (not shown) on the end (not shown) of the neck 18, the neck having a socket with internal threads (not shown) as is known and standard in the industry. The neck 18 and socket with internal threads are sometimes hereinafter referred to as the female connecting means. The hand-held cylinder 14 is also generally cylindrical along its body 24 and tapers in a relatively small neck portion 26 having an inlet (not shown) as is known in the art. The hand-held cylinder neck portion 26 bears a needle valve (not shown) in registry with the inlet and which regulates fuel flow in and out of the cylinder 14. In addition, the hand-held cylinder neck portion 26 has a threaded outer wall (not shown) adjacent the inlet. The neck portion and threaded outer wall are sometimes hereinafter referred to as the male connecting means. The needle valve is of conventional type including a plunger (not shown) which releases a seal (not shown) when the plunger is pushed inwardly against a spring (not shown) disposed between the seal and a stop (not shown). Fully fueled hand-held cylinders of this type generally contain 14.1 or 16.4 ounces of pressurized gas and liquid, typically propane.

Figure 3:
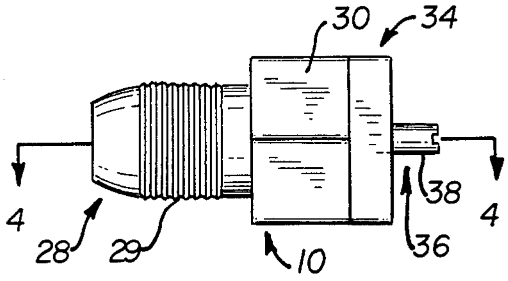
FIG. 3 is a side elevational view of the device.

As illustrated in FIG. 3, the device 10 comprises a first end 28 (herein-after sometimes the "male end") having outer threads 29 and shaped so as to readily threadably mount to the industry standard threaded outlet within the socket of the tank neck 18. The device 10 also comprises a central, hexagonal section 30, the hexagonal shape permitting the device 10 to be easily installed onto the tank outlet with a conventional box end wrench 32 or similar tool of the type illustrated in FIG. 1. In addition, the device 10 includes a relatively short tube section 34 (hereinafter sometimes referred to as the or the female end "second end") which by means of inner threads 46, FIG. 4, covers and threadably engages the threaded inlet of the hand-held cylinder 14. The device 10 further includes a hollow finger 36 having a slotted outer end 38. The finger 36 is of such a length that when the device 10 is threadably mounted to the hand-held cylinder 14, the finger depresses the cylinder needle valve, thereby permitting gas/liquid to readily flow into or out of cylinder. Gas/liquid flow between the tank 12 and the cylinder 14 is regulated by means of the valve 20 mounted on the neck 18 of the tank 12. A user can transfer gas/liquid from one container to the other simply by opening the valve 20 upon manual actuation of the hand knob 22 after the device 10 has been mounted to and between the tank 12 and the cylinder 14.

Figure 4:
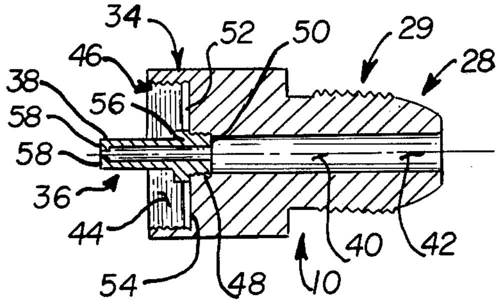
FIG. 4 is a cross-sectional view of the device taken along lines 4—4 of FIG. 3.

Referring now to FIG. 4, the device 10 is tube-like in construction to permit fuel to flow between the tank 12 and the cylinder 14. To this end, the device 10 comprises a central bore 40 extending longitudinally through the device 10. The bore 40 has a narrow portion 42 extending inwardly from the first end 28 and into and through the central, hexagonal section 30, and an enlarged portion 44 extending inwardly and through the second end 34 and meeting the narrow portion of the bore where the central section 30 meets the second end 34. The narrow portion 42 of the bore 40 includes a threaded wall portion 48 adjacent the enlarged portion 44. The bore enlarged portion's inner wall bears the threads 46 of a design to match the exterior threads on the hand-held cylinder 14.

The hollow finger 36 includes a central aperture 49 extending longitudinally therethrough and a threaded inner end 50 opposite the slotted outer end 38. The finger 36 is threadably mounted to the threaded wall portion 48 of the bore narrow portion 42 through the enlarged portion 44 of the bore 40. In the preferred embodiment, the hollow finger 36 is manufactured separate from the central section 30 of the device 10 and is threadably mounted thereto in the manner described above. It is contemplated, however, that the device could be machined as one piece by those skilled in the art.

A gasket or washer 52 is positioned on a shelf 54 formed between the narrow and enlarged portions 42, 44 of the bore 40. The gasket 52 circumscribes the finger 36 to effectively seal the fitting between the second end 34 of the device and the outlet of the hand-held cylinder 14. The gasket 52 may be made of cork, rubber or similar material.

The first end outer threads 29 and the second end inner threads 46 are in a reverse direction with respect to each other as is general policy for safety considerations. For example, the threads 29 on the first end 28 are left-hand, and the threads 46 at the second end 34 are right-hand. These thread directions match what is industry standard for the two types of gas/liquid containers 12, 14. It should be noted, however, that the direction of the threads has no bearing on the scope of the invention other than to show one operative embodiment.

Figure 5:
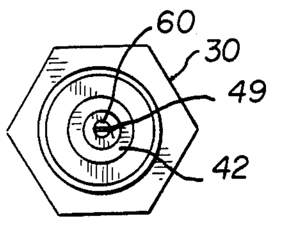
FIG. 5 is an elevational view of a first end of the device.
Figure 6:
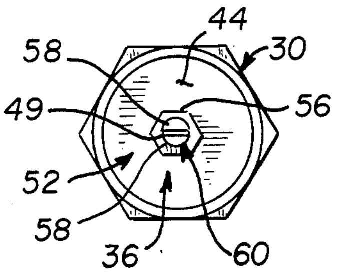
FIG. 6 is an elevational view of a second end of the device.

Referring now to FIGS. 5 and 6, illustrating elevational views of the second and first ends 34, 28 of the device 10, it is shown that the hollow finger 36 includes an enlarged hexagonal base 56 adjacent the threaded inner end 50 of the finger. The hexagonal shape of the base 56 facilitates the finger's installation onto the threaded wall 48 of the bore narrow portion 42. It is also shown in FIGS. 5 and 6, as well as in FIG. 4, that the outer end 38 of the finger 36 includes inwardly-facing walls 58 forming a slot 60 therebetween. When the device 10 is mounted to the cylinder 14, the finger 36, and specifically the opposing walls 58 thereof, engage and depress the needle valve of the cylinder to its inner position to thereby open the valve. The size of the needle valve relative to the dimensions of the slot is such that the needle valve rests against edges of the walls 58 and in partial registry with the slot. Fuel flowing to or from the cylinder 14, when the device 10 is mounted to the cylinder passes, around the depressed needle valve and through the slot 60.

In operation, to fuel a substantially empty hand-held cylinder 14 from a fueled tank 12, the device first and second ends 28,34 are threadably mounted onto the tank neck 18 and the hand-held cylinder 14 neck portion 26, respectively, in the manner described above. Mounting the device 10 to the cylinder 14 causes the hollow finger 36 to engage and open the needle valve of the cylinder. The regulating valve 20 of the tank 12 is then manually opened thereby permitting pressurized fuel to pass through the first end 28, and specifically the narrow portion 42 of the bore 40, into the aperture 49 of the finger 36, out of the slotted outer end 38 of the finger and into the cylinder. When the cylinder 14 has been fueled, the valve 20 is closed and the cylinder is removed from its threaded connection to the device 10. The needle valve in its now closed position prevents the leakage of fuel from the cylinder 14.

Preferably, the device 10 is machined from brass. However, virtually any nonporous material could be employed in making the device, and the material does not affect the performance of the invention other than regards to the material and manufacturing costs.

While the invention has been described with reference to a preferred embodiment, it will be understood that the invention is not limited to the disclosed embodiment. To the contrary, reasonable variations, alternatives, modifications and equivalents are possible within the spirit and scope of the invention as defined by the appended claims.

I claim:

1. A device for directly interconnecting first and second containers for transferring fluid between said first and second containers, said first container comprising female connecting means, an outlet and a valve movable between a closed position to close said outlet and an open position to permit fluid to exit or enter said first container through said outlet, said second container comprising male connecting means, an inlet and a needle valve movable between an outer position to close said inlet and an inner position to permit fluid to enter or exit said second container through said inlet, said needle valve normally urged in said outer position by a biasing means, and said device comprising:

a male end adapted to be removably mounted directly to said first container female connecting means, a female end adapted to be removably mounted directly to said second container male connecting means, a longitudinal bore extending through said male and female ends and adapted to align with said first container outlet and said second container inlet when said device is mounted to said first and second containers, and a finger means adapted to force said needle valve to said inner position against said biasing means when said device is mounted to said second container;

whereby fluid is transferred between said first and second containers when said device is mounted to said first and second containers and said first container valve is set in said open position.

2. A device according to claim 1, wherein said first container female connecting means comprises a neck and said second container connecting means comprises a neck portion; and said device further comprises a first mounting means on said male end and adapted to securely mount and seal said device with respect to said first container neck, and a second mounting means on said female end and adapted to securely mount and seal said device with respect to said second container neck portion.

3. A device according to claim 2, wherein said first container neck adjacent said outlet further comprises a socket having a first threaded inner wall; and said first mounting means comprises a first threaded outer wall adapted to register with said socket and threadably engage said first threaded inner wall to mount and seal said device with respect to said first container.

4. A device according to claim 2, wherein said second container neck portion adjacent said inlet further comprises a second threaded outer wall, said bore comprises an enlarged portion at said device second end, and said female mounting means comprises a second threaded inner wall of said bore enlarged portion and adapted to threadably engage said second threaded outer wall to mount and seal said device with respect to said second container.

5. A device according to claim 4, wherein said bore further comprises a narrow portion, said bore narrow and enlarged portions forming a shelf therebetween, and said second mounting means further comprises a gasket positioned on said shelf and against which said second container neck portion is adapted to engage to seal said device with respect to said second container.

6. A device according to claim 2, wherein said first container neck adjacent said outlet further comprises a socket having a first threaded inner wall, said second container neck portion adjacent said inlet further comprises a second threaded outer wall, and said bore comprises an enlarged portion at said device female end; and said first mounting means comprises a first threaded outer wall adapted to register with said socket and threadably engage said first threaded inner wall to mount and seal said device with respect to said first container, and said second mounting means comprises a second threaded inner wall of said bore enlarged portion and adapted to threadably engage said second threaded outer wall to mount and seal said device with respect to said second container.

7. A device according to claim 6, wherein said bore further comprises a narrow portion, said bore narrow and enlarged portions forming a shelf therebetween, and said second mounting means further comprising a gasket positioned on said shelf and against which said second container neck portion is adapted to engage to seal said device with respect to said second container.

8. A device according to claim 7, wherein said device further comprises a hexagonal outer wall between said first and second ends and adapted to facilitate threaded mounting of said device to said male and female containers.

9. A device according to claim 8, wherein said threads of said first and second mounting means on said male and female ends of said device are in reverse direction.

10. A device according to claim 6, wherein said finger means is tubular, is positioned in registry with said bore enlarged portion, has inner and outer ends and a longitudinal aperture extending through said inner and outer ends and aligned with said device bore, and is one of securely mounted to and formed integral with a wall of said bore narrow portion adjacent said bore enlarged portion;

whereby fluid is transferred between said first and second containers through said aligned bore narrow portion and said finger means aperture.

11. A device according to claim 10, wherein said finger means outer end comprises inwardly-opposing walls forming a narrow slot therebetween aligned with said aperture, said walls being adapted to engage and move said needle valve to said inner position, with said needle valve resting against edges of said wall and in partial registry with said slot, when said device is mounted to said second container.

12. A device according to claim 11, wherein said finger means is securely mounted to said wall of said bore narrow portion, and said device further comprises a mounting means for securely mounting and sealing said finger with respect to said bore narrow portion wall.

13. A device according to claim 12, wherein said mounting means comprises an outer threaded side of said finger means inner end and threads on said bore narrow portion wall, said finger means threaded side being adapted to threadably engage and seal with respect to said bore narrow portion wall to securely mount and seal said finger means to said bore narrow portion wall.

14. A device according to claim 13, wherein said mounting means further comprises a portion of said gasket circumscribing said finger means adjacent to said bore narrow portion threaded wall.

15. A device according to claim 14, wherein said finger means further comprises a hexagonal outer surface for facilitating threaded secure mounting of said finger means to said bore narrow portion wall.

* * * * *